(No Model.)

W. A. HULL.
BARREL TRUCK.

No. 565,989. Patented Aug. 18, 1896.

Attest.
J. F. Groat.
L. A. St. John.

Inventor.
William A. Hull
By J. M. St. John
Atty.

UNITED STATES PATENT OFFICE.

WILLIAM A. HULL, OF CEDAR RAPIDS, IOWA.

BARREL-TRUCK.

SPECIFICATION forming part of Letters Patent No. 565,989, dated August 18, 1896.

Application filed January 31, 1896. Serial No. 577,638. (No model.)

*To all whom it may concern:*

Be it known that I, WILLIAM A. HULL, a citizen of the United States, residing at Cedar Rapids, in the county of Linn and State of Iowa, have invented certain new and useful Improvements in Barrel-Trucks; and I do hereby declare the following to be a full, clear, and exact description of the invention, such as will enable others skilled in the art to which it appertains to make and use the same.

This invention relates more particularly to trucks used in packing-houses and the like for transporting empty barrels and tierces from one part of the building to another, and has for its object certain improvements in construction whereby the truck is adapted for the convenient handling of a large number of such articles at once.

The invention consists in the construction, combination, and arrangement of parts, as will be hereinafter fully set forth and claimed, reference being had to the accompanying drawings, in which—

Figure 1:
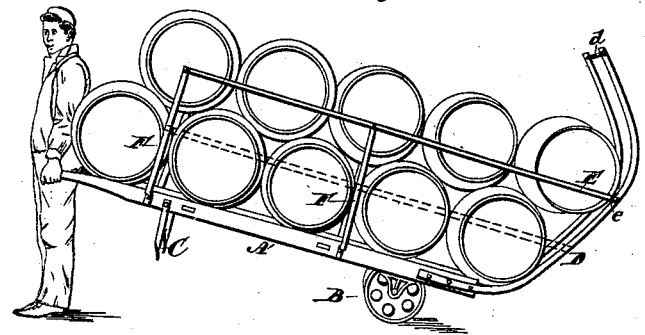
Figure 2:
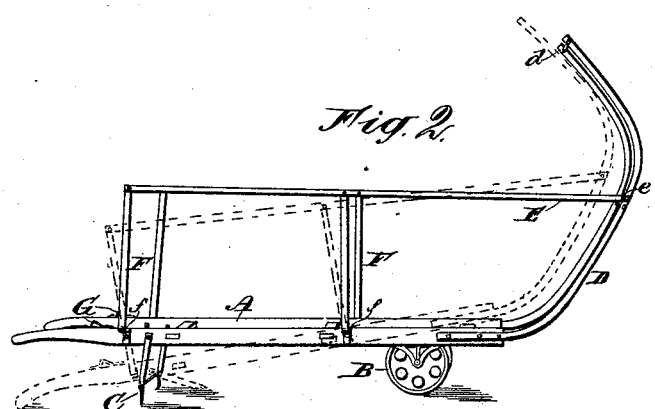
Figure 4:
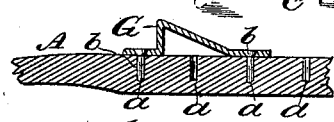
Figure 3:
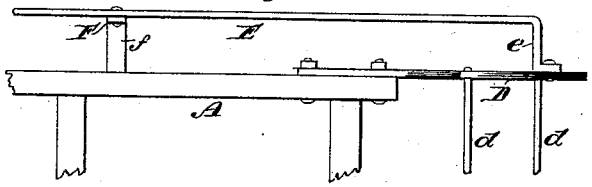

Figure 1 is a side perspective view of the same as in use. Fig. 2 is a similar view showing the truck in position to receive a load of barrels. Fig. 3 is a fragmentary plan view of the truck-frame and rack. Fig. 4 is a longitudinal section of one of the truck-handles, showing the adjustable stop for the barrels.

Similar letters of reference indicate corresponding parts.

In many establishments, such, for example, as packing-houses, it is necessary to move a great many empty barrels and casks from one part of the establishment, where they have been emptied, to another part, more or less remote, where they are refilled. This is commonly a slow and laborious operation, the trucks in general use for the purpose being adapted to hold not more than two or three barrels, and usually but one. This truck is designed to greatly lessen the work of transporting such barrels by so constructing the truck that a large number of barrels may be quickly loaded thereon, easily moved from place to place, and quickly dumped at their destination.

Referring now to the drawings, A denotes a truck-frame with wheels B B similar to those in common use, except that the frame is made longer than that of the ordinary floor-truck. Near the handles this is provided with a pair of legs C, hinged to the frame. In their normal position they stand vertical, as shown in Fig. 2, but when it is desired to dump the load the truck is pushed forward, or the legs swung backward, when the handles drop to the floor and the whole load of barrels rolls off the inclined truck-frame.

To the back end of the frame is secured a pair of curved bars D, inclining upwardly and backwardly a considerable distance, and thence curving forwardly and still upwardly. These serve to retain one end of the load of barrels, as shown in Fig. 1. They also serve as a support for the truck when turned up to a nearly vertical position to occupy less floor-space when not in use, as will be readily understood.

At each side of the frame standards F F are suitably secured thereto and support a side rail E each side suitably fastened to each bar D. This rail is at a suitable height to retain the second tier of barrels, as shown in Fig. 1. One or more intermediate rails may be provided, as indicated by the dotted lines in Fig. 1, so as to retain kegs or small casks.

Suitable tie-rods $d$ $d$ connect the curved bars D D and brace them laterally.

The frame of the truck is made considerably narrower than the length of the barrels, and the end bars D D are bolted directly to the sides of the frame. The rails E E are therefore provided with a rear offset $e$ to carry the body of the rail far enough out so that the barrels will pass between them. For the same reason the lower ends of the standards F F are offset at $f f$, as shown in Fig. 3. When loaded, the lower tier of barrels is held from lateral displacement by the bulge of the barrels, which lie between the side bars of the frame and the bars D D.

The barrels are held on the truck at the front end by a pair of stops G G, which in practice are made adjustable, having pins $b$ $b$ entering holes $a$ $a$ $a$ $a$ in the truck-frame, so that the stop may be set backward for barrels, and forward for tierces and the like. These stops are made high enough to stop the forward roll of the barrels when the truck-frame is horizontal, but not enough to prevent their rolling off the truck when in the inclined position indicated by the dotted lines in Fig. 2.

Having thus described my invention, I claim—

1. In a barrel-truck, the combination with the truck-frame A provided with suitable wheels B B, of the curved end bars D D, the side rails E E, having offsets $e$, and the standards F F having offsets $f\,f$, substantially as and for the purpose set forth.

2. In a barrel-truck, the combination with the truck-frame and its carrying-wheels, of the curved end bars D D connected by tie-rods $d\,d$, the offset side rails E E and standards F F, and the adjustable stops G G, substantially as and for the purpose set forth.

3. In a barrel-truck, the combination with the truck-frame and its carrying-wheels, of the barrel-rack composed of the curved end bars D D connected by suitable tie-rods, the offset side rails and standards, the back-stops and the pivoted legs, substantially as and for the purpose set forth.

In testimony whereof I affix my signature in presence of two witnesses.

WILLIAM A. HULL.

Witnesses:
H. C. SMITH,
J. F. GROAT.